United States Patent
McCarthy et al.

(10) Patent No.: US 8,567,772 B2
(45) Date of Patent: Oct. 29, 2013

(54) ADJUSTABLE SPRING MOUNTING ASSEMBLY

(75) Inventors: Robert E. McCarthy, Frankfort, IL (US); Robert F. Mater, Jr., Elkhart, IN (US); Auldreg R. Dismuke, Elkhart, IN (US)

(73) Assignee: BBS Development, LLC, Frankfort, IL (US)

( * ) Notice: Subject to any disclaimer, the term of this patent is extended or adjusted under 35 U.S.C. 154(b) by 472 days.

(21) Appl. No.: 12/717,606

(22) Filed: Mar. 4, 2010

(65) Prior Publication Data

US 2011/0068524 A1 Mar. 24, 2011

Related U.S. Application Data

(60) Provisional application No. 61/244,655, filed on Sep. 22, 2009.

(51) Int. Cl.
 *B60G 11/10* (2006.01)
 *B60G 11/00* (2006.01)
(52) U.S. Cl.
 USPC .................................. 267/265; 280/124.175
(58) Field of Classification Search
 USPC .......................... 188/265, 284, 260; 403/3, 4; 248/222.14, 223.31, 225.11; 280/124.17, 124.175, 86.754
 See application file for complete search history.

(56) References Cited

U.S. PATENT DOCUMENTS

| | | | |
|---|---|---|---|
| 4,846,495 A | 7/1989 | Laidely | |
| 4,919,404 A * | 4/1990 | Santini | 267/260 |
| 4,998,749 A * | 3/1991 | Bockewitz | 280/6.159 |
| 5,016,906 A | 5/1991 | Cadden | |
| 5,599,038 A | 2/1997 | German | |
| 5,683,098 A | 11/1997 | VanDenberg | |
| 6,220,580 B1 | 4/2001 | Balczun | |
| 6,527,287 B2 | 3/2003 | Hedenberg | |
| 6,966,612 B2 | 11/2005 | Philpott | |
| 7,213,825 B2 | 5/2007 | Hitt et al. | |
| 7,415,771 B2 | 8/2008 | Harrill | |
| 7,467,473 B2 | 12/2008 | Harrill et al. | |
| 7,513,517 B2 | 4/2009 | Barton et al. | |
| 7,537,226 B1 * | 5/2009 | Collazo | 280/124.175 |
| 7,673,891 B2 * | 3/2010 | Johns | 280/124.17 |
| 2007/0052195 A1 * | 3/2007 | Collazo | 280/124.175 |

* cited by examiner

*Primary Examiner* — Bradley King
*Assistant Examiner* — Vishal Sahni
(74) *Attorney, Agent, or Firm* — King & Schickli, PLLC

(57) ABSTRACT

An adjustable spring mounting assembly having a first lug with a first elongated opening with a first channel and a second lug with a second elongated opening and a second channel. A mounting pin extends through the first and second elongated openings. First and second spacers received in the first and second channels hold the mounting pin in one of at least two mounting positions.

16 Claims, 3 Drawing Sheets

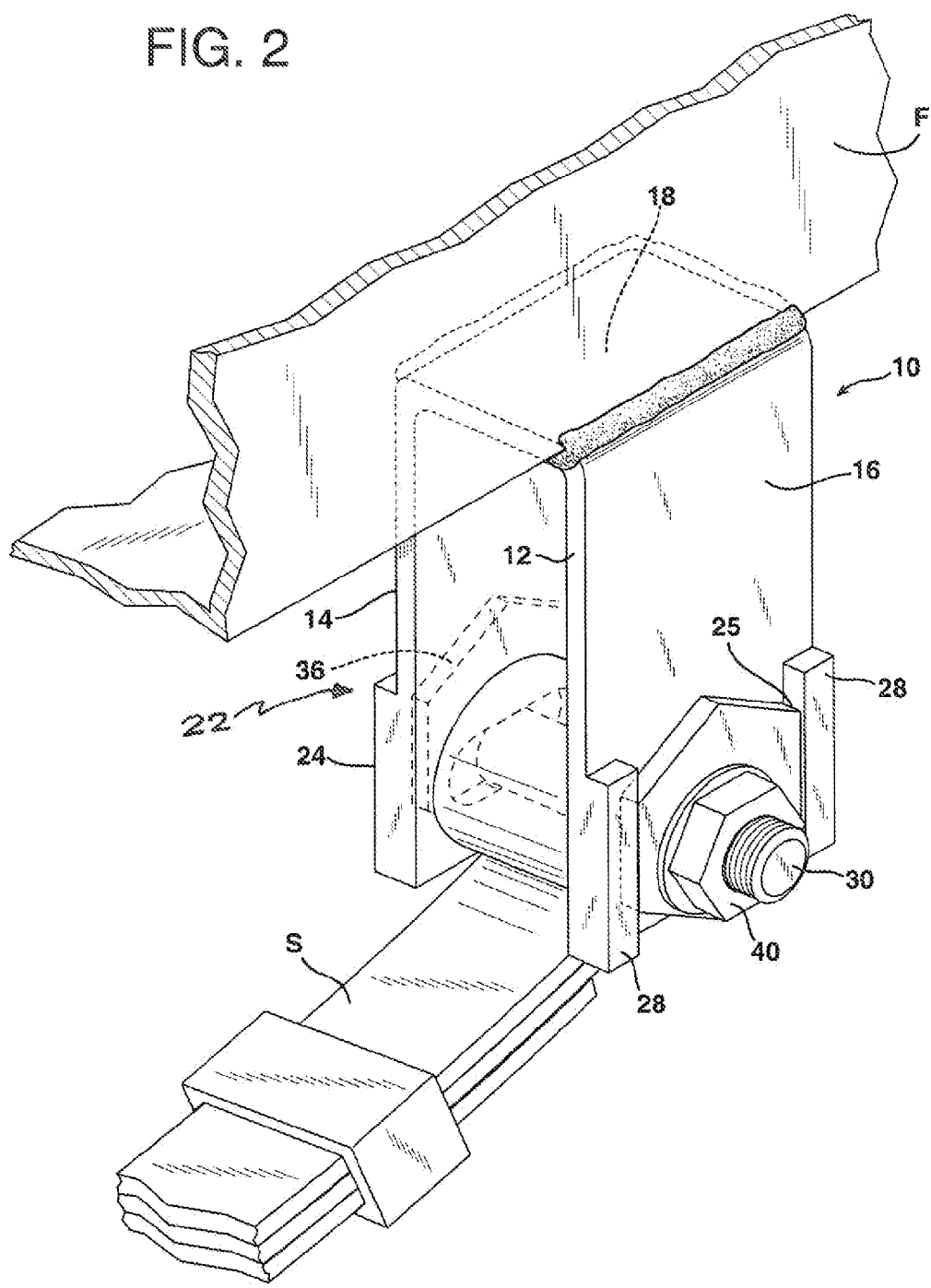

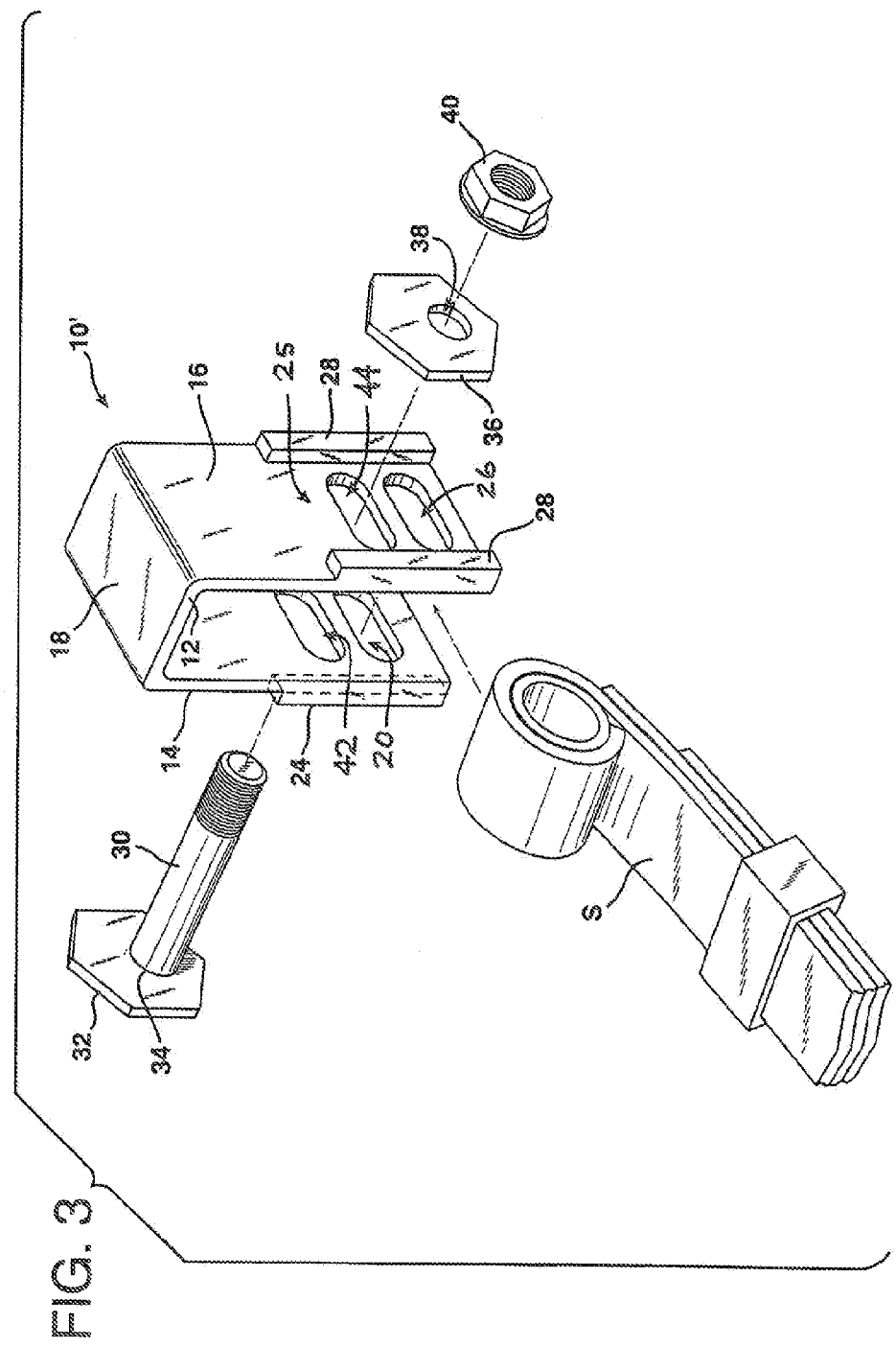

ADJUSTABLE SPRING MOUNTING ASSEMBLY

This application claims priority to U.S. Provisional Patent Application Ser. No. 61/244,655 filed 22 Sep. 2009, the full disclosure of which is incorporated herein by reference.

TECHNICAL FIELD

The present invention relates generally to the vehicle field and more particularly to a mounting assembly or hanger to retain the end of a leaf spring to the frame of a vehicle as well as to a method of aligning first and second axles of a vehicle.

BACKGROUND OF THE INVENTION

Multi-axle trailers are relatively common in the art. As a result of a permanent unbalanced weight distribution on the trailer or other circumstances, the axles of the trailer may become partially misaligned. The present invention relates to an adjustable leaf spring mounting assembly or hanger that may be utilized to correctly align those axles. By eliminating misalignment between axles, the tread on the tires wears evenly, the tires run cooler and the risk of blowouts is reduced. In addition, towing resistance is reduced and gas mileage is improved.

SUMMARY OF THE INVENTION

In accordance with the purposes of the present invention as described herein, an adjustable spring mounting assembly comprises a bracket including (a) a first lug having a first elongated opening and a first channel and (b) a second lug having a second elongated opening and a second channel. The mounting assembly further includes a mounting pin extending through the first and second elongated openings, a first spacer received in the first channel and a second spacer received in the second channel. The first spacer receives and holds a first end of the mounting pin in one of at least two possible mounting positions. The second spacer receives and holds a second end of the mounting pin in the select one of at least two possible mounting positions. A trailer is also provided comprising a trailer frame incorporating at least one adjustable spring mounting assembly as just described.

In accordance with another aspect of the present invention a method is provided of aligning one or more axles on a frame of a vehicle. The method comprises the steps of: (a) providing adjustable spring mounting assemblies on the frame of a vehicle; (b) measuring to confirm proper alignment geometry of the one or more axles; and (c) adjusting the position of the spring mounting pins in the spring mounting assemblies so as to secure the one or more axles in proper alignment on the frame.

In accordance with yet another aspect of the present invention a method is provided of aligning one or more axles on a frame of a vehicle. The method comprises the steps of (a) providing adjustable spring mounting assemblies on the frame; (b) measuring to confirm proper alignment geometry of the one or more axles; and (c) adjusting mounting points of the vehicle springs on the spring mounting assemblies and securing the one or more axles in proper alignment on the frame.

In accordance with still another object of the present invention a method is provided of enhancing a trailer frame including a coupler or king pin. The method comprises equipping the trailer frame with an adjustable spring mounting assembly allowing both an original equipment manufacturer of a trailer and an individual in the field to adjust or align one or more axles of the trailer to the coupler or king pin.

In the following description there is shown and described several different embodiments of the invention, simply by way of illustration of some of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated herein and forming a part of the specification, illustrate several aspects of the present invention and together with the description serve to explain certain principles of the invention. In the drawings:

FIG. 2 is a perspective view illustrating the mounting assembly of FIG. 1 welded to the frame of a trailer and holding a leaf spring; and FIG. 3 is a view similar to FIG. 1 but showing an alternative embodiment of the present invention.

Figure 1:
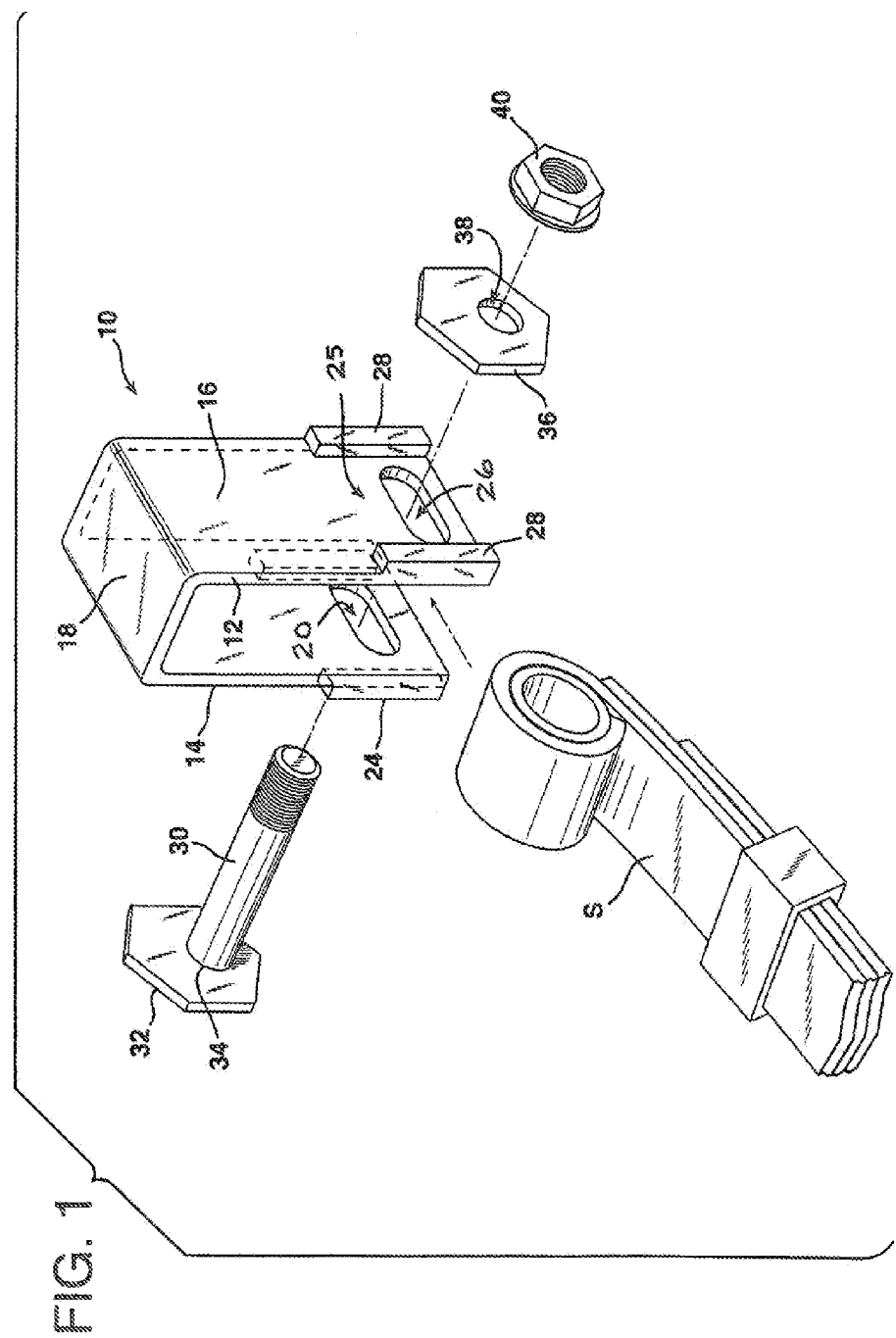
FIG. 1 is a perspective view of the adjustable leaf spring mounting assembly of the present invention.

Reference will now be made in detail to the present preferred embodiment of the invention, examples of which are illustrated in the accompanying drawings.

DETAILED DESCRIPTION OF THE INVENTION

Reference is now made to FIG. 1 illustrating the adjustable spring mounting assembly or hanger 10 of the present invention. The mounting assembly includes a substantially U-shaped bracket 12 having a first lug 14, a second lug 16 and a base section 18 connecting the first and second lugs. As illustrated in FIG. 1 the first lug 14 has a first elongated opening 20 and a first channel 22 defined between two blocks 24 defining the side walls of the channel.

Similarly, the second lug 16 includes a second elongated opening 26 aligned with the first elongated opening 20, and a second channel 25 (not shown in FIG. 1 but shown in FIG. 2) defined between two mounting blocks 28. A mounting pin 30, in the form of a bolt and cooperating nut, extends through the elongate openings 20, 26 (see FIG. 2). A first hex-cam or spacer 32, in the form of a multi-sided eccentric place includes an aperture 34 engaging the mounting pin 30 adjacent the head thereof. A second hex-cam or spacer 36 in the form of a second, multi-sided eccentric plate includes an aperture 38 for engaging the mounting pin 30 at the nut receiving end. The first and second spacers 32, 36 are preferably identical.

As illustrated in FIG. 2, the adjustable spring mounting bracket 10 is mounted to the frame F of a trailer T by welding or otherwise securing the base section 18 of the bracket 12 to the frame. The mounting point for the leaf spring S of the trailer axle (not shown) is then adjustable depending upon the orientation of the spacers 32, 36. More specifically, the first channel 22 has a width between the side walls defined by the blocks 24 that substantially corresponds to the width of the first spacer 32 but includes the necessary clearance to allow the spacer 32 to be received in channel 22. By rotating or manipulating the eccentric spacer 32, the position of the mounting pin 30 in the aligned elongated slots 20, 26 may be adjusted forward or rearward as desired to properly align the axles of the trailer in accordance with a method that will be described in greater detail below. The elongated openings 20, 26 may, for example, allow up to 1.5 inches of fore/aft adjustment. When properly seated, the opposing side walls of the first spacer 32 engage the side walls of the channel 22 defined by the blocks 24.

After inserting the pin 19 through the slot 20, the end of the leaf spring S and the slot 26, the second spacer 36 is positioned in the second channel on the second lug 16. The spacer 36 is oriented so that the end of the mounting pin 30 is received through the aperture 38 and the second spacer 36 is seated fully in the second channel with the side walls of the spacer abutting the side walls of the channel 25 formed by the blocks 28. The nut 40 is then secured on the end of the mounting pin to complete the connection. At this point it should be appreciated that the spacers 32, 36 are securely held in the channels 22, 25 and, therefore, in turn, the mounting pin 30 is secured in position in the elongated slots 20, 26 at the desired position to provide proper axle alignment.

An alternative embodiment of the mounting assembly 10' is illustrated in FIG. 3. Like components in the mounting assembly 10' are provided with the same reference numbers used for the mounting assembly 10 illustrated in FIGS. 1 and 2. The differences between the two embodiments 10, 10' will now be described. Specifically, in the second embodiment 10', the first lug 14 includes a third elongated opening 42 and the second lug 16 includes a fourth elongated opening 44. The third and fourth elongated openings 42, 44 are aligned. The blocks 24 and 28 are longer so as to form longer channels 22, 25. Thus, channel 22 holds both elongated openings 20, 42 while channel 25 holds both elongated openings 26, 44. The second embodiment 10' illustrated in FIG. 3 provides still greater adjustability as the mounting pin 30 may be positioned/received in either set of openings 20, 26 or 42, 44 and then positioned by the spacers 32, 36 at different points along those sets of openings.

The method of aligning one or more axles on a frame of a vehicle in accordance with the present invention includes the steps of (a) providing adjustable spring mounting assemblies 10, 10' of the type illustrated in the drawing figures on a frame of a vehicle; (b) measuring to confirm proper alignment geometry of the one or more axles; and (c) adjusting the position of the spring mounting pins 30 in the spring mounting assemblies 10, 10' so as to secure the one or more axles in proper alignment on the frame. Where the vehicle is a trailer with a coupler or king pin the measuring step includes measuring between the coupler or king pin and the one or more axles at a left side of the frame and a right side of the frame. Further, the adjusting step includes manipulating eccentric cams or spacers 36 with respect to the brackets 12 of the mounting assemblies 10, 10'.

Alternatively, the method of aligning one or more axles on a frame of a vehicle may be broadly described as comprising: (a) providing adjustable spring mounting assemblies on the frame; (b) measuring to confirm proper alignment geometry of the one or more axles; and (c) adjusting mounting points of vehicle springs on the spring mounting assemblies and securing the one or more axles in proper alignment on the frame. Retrofitting of the spring mounting assemblies 10, 10' to the frame of a vehicle or trailer may be easily performed in the field by completing installation in accordance with the following directions.

1.) Disconnect Battery and LP gas.
2.) Level trailer and measure from kingpin or coupler to axles on left and right. Mark location for future measurements and record measurements.
3.) Remove wheels and springs from original hangers. Use jacks to support axles.
4.) Measure from kingpin or coupler and record measurements from front left and right hangers. Some trailers weight more on different sides, which causes the springs to spread apart which cause miss alignment.
5.) Mark location of new front assemblies 10, 10'. Make adjustments so new front assemblies 10, 10' are aligned to kingpin or coupler.
6.) Measure from front hanger to center hanger and record measurements. Mark location for new front assemblies 10, 10' on left and right side.
7.) Measure from center hanger to rear hanger and record measurements. Mark location for new rear front assemblies 10, 10' left and right side.
8.) Install new left and right assemblies 10, 10' on marks made before removing old hangers.
9.) Remove all old spring hangers and clean surface.
10.) Using recorded measurements install new center right and left assemblies 10, 10'.
11.) Using recorded measurements install new rear right and left assemblies 10, 10'.
12.) Reinstall springs and axles on new assemblies 10, 10', making sure all cams 32, 36 are installed in the same position.
13.) Re-measure from kingpin or coupler to front axle location on both right and left side. Make adjustments using new front assemblies 10, 10' to bring axles in alignment to kingpin or coupler.
14.) Using straight edge on face of brake drum adjust rear axle so straight edge is aligned to front brake drum.
15.) Tighten all spring bolts and install tires. Spring bolt nuts should be tighten until they bottom out on bolt flange. DO NOT OVER TIGHTEN.
16.) Measure front axle to rear axle to verify front and rear axles are the same measurement. Remember some trailers weight different from side to side.
17.) You can use straight edge on face of tires to check alignment.

In accordance with yet another aspect of the present invention a method is provided of enhancing a trailer frame including a coupler or king pin. The method may be broadly described as comprising the equipping of the trailer frame with an adjustable spring mounting assembly 10, 10' allowing both an original equipment manufacturer of the trailer and an individual in the field to adjust and align one or more axles of the trailer to the coupler or king pin. More particularly, an original equipment manufacturer may utilize the mounting assemblies 10, 10' to align the axles in accordance with the following step by step instructions.

1.) Measure from king pin or coupler to adjustable spring mounting assembly 10, 10' located on the right and left making sure both are the same distance and marking the location.
2.) Tack weld front spring mounting assemblies 10, 10' on to frame F using measurements from king pin or coupler.
3.) Measure from front assembly 10, 10' to center spring mounting assembly location making sure both right and left are in the same location and mark location.
4.) Tack weld center spring mounting assembly 10, 10' on to frame F using measurements from front spring mounting assembly.
5.) Measure from center spring mounting assembly 10, 10' to rear spring mounting assembly 10, 10' making sure both right and left spring mounting assemblies are the same location and mark location.
6.) Tack weld rear spring mounting assembly 10, 10' on to frame F using measurements from center spring mounting assembly.
7.) Make final measurements to verify all spring mounting assemblies 10, 10' are in right location.

8.) Weld all spring mounting assemblies 10, 10' to their locations.

Numerous benefits result from employing the concepts of the present invention. More particularly, one or more axles may be properly aligned with the king pin or coupler of a trailer. Misalignment of axles can be caused by a number of factors including uneven loading between or across axles. By ensuring alignment of all axles of a multi-axle trailer, tire sidewall heating is reduced and tire life is increased. Further fuel mileage is reduced as the drag from misaligned tires is eliminated. In addition, proper multi-axle alignment helps keep the trailer straight when braking. Further, it should be appreciated that the axles may be spread slightly to provide more clearance between tires while still ensuring alignment between the axles. In many applications this will allow better trailer weight distribution over the axles and easier access for inspection and repair of suspension and brake components.

The foregoing description of the preferred embodiments of the present invention have been presented for purposes of illustration and description. It is not intended to be exhaustive or to limit the invention to the precise form disclosed. Obvious modifications or variations are possible in light of the above teachings. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled. The drawings and preferred embodiments do not and are not intended to limit the ordinary meaning of the claims in their fair and broad interpretation in any way.

What is claimed is:

1. An adjustable spring mounting assembly comprising:
   a bracket including (a) a first lug having a first elongated opening having a first longitudinal axis with a first end and a second end, and a first channel having a first sidewall and a second sidewall and (b) a second lug having a second elongated opening having a second longitudinal axis with a third end and a fourth end and a second channel having a third sidewall and a fourth sidewall;
   a mounting pin extending through said first and second elongated openings;
   a first spacer received in said first channel, said first spacer receiving and holding a first end of said mounting pin in one of at least two possible mounting positions; and
   a second spacer received in said second channel, said second spacer receiving and holding a second end of said mounting pin in said one of said at least two possible mounting positions;
   said adjustable spring mounting assembly being characterized by (a) said first longitudinal axis of said first elongated opening extending across said first channel so that said first end of said first longitudinal axis is adjacent to said first sidewall and said second end of said longitudinal axis is adjacent to said second sidewall and (b) said second longitudinal axis of said second elongated opening extending across said second channel so that said third end of said second longitudinal axis is adjacent to said third sidewall and said fourth end of said second longitudinal axis is adjacent to said fourth sidewall.

2. The assembly of claim 1, wherein said bracket is substantially U-shaped and includes a base section connecting said first and second lugs.

3. The assembly of claim 2, wherein said mounting pin is a bolt and cooperating nut.

4. The assembly of claim 1 wherein said first spacer comprises a first-six-sided, eccentric plate that provides three possible fixed mounting positions.

5. The assembly of claim 4, wherein said first, six-sided, eccentric plate includes an aperture engaging said mounting pin and at least two sides engaging said first and second sidewalls of said first channel.

6. The assembly of claim 5, wherein said second spacer comprises a second, six-sided, eccentric plate that provides three possible fixed mounting positions.

7. The assembly of claim 6, wherein said second, six sided, eccentric plate includes an aperture engaging said mounting pin and at least two sides engaging said third and fourth sidewalls of said second channel whereby rotation of said first and second eccentric plates in said first and second channels adjusts a position of said mounting pin in said aligned first and second elongated openings as desired to properly align an axle of a trailer.

8. The assembly of claim 1, wherein said first lug further includes a third elongated opening spaced from said first elongated opening and said second lug includes a fourth elongated opening spaced from said second elongated opening where said third elongated opening includes a third longitudinal axis and said fourth elongated opening includes a fourth longitudinal axis.

9. The assembly of claim 8, wherein said first and second elongated openings are aligned and said third and fourth elongated openings are aligned.

10. The assembly of claim 9, wherein said bracket is substantially U-shaped and includes a base section connecting said first and second lugs.

11. The assembly of claim 10, wherein said mounting pin is a bolt and cooperating nut.

12. The assembly of claim 9 wherein said first spacer comprises a first-six-sided, eccentric plate that provides three possible fixed mounting positions.

13. The assembly of claim 12, wherein said first, six-sided, eccentric plate includes an aperture engaging said mounting pin and at least two sides engaging said first and second sidewalls of said first channel.

14. The assembly of claim 13, wherein said second spacer comprises a second, six-sided, eccentric plate that provides three possible fixed mounting positions.

15. The assembly of claim 14, wherein said second, six-sided, eccentric plate includes an aperture engaging said mounting pin and at least two sides engaging said third and fourth sidewalls of said second channel.

16. A trailer, comprising a trailer frame incorporating at least one adjustable leaf spring mounting assembly as set forth in claim 1.

* * * * *